(12) United States Patent
Hakomori et al.

(10) Patent No.: US 7,929,862 B2
(45) Date of Patent: Apr. 19, 2011

(54) OPTICAL TRANSMISSION SYSTEM AND OPTICAL TRANSMISSION METHOD

(75) Inventors: Katsuhiko Hakomori, Kawasaki (JP);
Hiroshi Nishimoto, Kawasaki (JP);
Akihiko Ichikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 11/045,486

(22) Filed: Jan. 31, 2005

(65) Prior Publication Data
US 2006/0067693 A1      Mar. 30, 2006

(30) Foreign Application Priority Data

Sep. 30, 2004   (JP) ................................. 2004-286996

(51) Int. Cl.
*H04J 14/00* (2006.01)
(52) U.S. Cl. ............... 398/66; 398/69; 398/70; 398/72; 398/79; 398/158; 398/159; 398/192; 398/194
(58) Field of Classification Search .............. 398/39, 398/40, 66–76, 82, 135, 136, 154, 158, 159, 398/182, 201; 375/259; 455/63, 63.3; 380/216; 386/34
See application file for complete search history.

(56) References Cited

U.S. PATENT DOCUMENTS

| | | | | |
|---|---|---|---|---|
| 4,646,147 A * | 2/1987 | Kruger | ........................... | 380/216 |
| 5,144,669 A | 9/1992 | Faulkner et al. | | |
| 5,473,696 A | 12/1995 | Van Breemen et al. | ......... | 380/49 |
| 5,706,385 A * | 1/1998 | Suzuki et al. | ................... | 386/34 |
| 5,748,348 A | 5/1998 | Heidemann et al. | | |
| 5,983,078 A * | 11/1999 | Bossard | ........................ | 455/63.3 |
| 7,343,101 B1 * | 3/2008 | Frankel et al. | ................ | 398/158 |
| 2003/0170028 A1 | 9/2003 | Mori et al. | ....................... | 398/79 |
| 2005/0047512 A1 * | 3/2005 | Neff et al. | ....................... | 375/259 |
| 2006/0039699 A1 * | 2/2006 | Farmer et al. | ................... | 398/66 |
| 2007/0166038 A1 | 7/2007 | Yano | | |

FOREIGN PATENT DOCUMENTS

| | | | |
|---|---|---|---|
| JP | 06-176232 | * | 8/1987 |
| JP | 2-501432 | | 5/1990 |
| JP | 06-188878 | | 7/1994 |
| JP | 6-1888878 | | 7/1994 |
| JP | 7-193566 | | 7/1995 |
| JP | 8-251578 | | 9/1996 |
| JP | 11-127153 | | 5/1999 |
| JP | 2000-358013 | | 12/2000 |
| JP | 2002-050985 | | 2/2002 |
| JP | 2006-14227 | | 1/2006 |
| WO | WO 02-35665 | | 5/2002 |

OTHER PUBLICATIONS

Farmer et al: U.S. Appl. No. 60/600,196, filed Aug. 10, 2004, pp. 1-27.*

(Continued)

*Primary Examiner* — Li Liu
(74) *Attorney, Agent, or Firm* — Staas & Halsey LLP

(57) ABSTRACT

After implementing a scrambler upon an electric signal of digital signals to be transmitted to a user terminal, this electric signal is converted into a digital optical signal, and an analog optical signal and this digital optical signal are multiplexed by wavelength division multiplexing, thereby reducing influence of cross-talk interference that is exerted on the analog optical signal by the digital optical signal.

4 Claims, 11 Drawing Sheets

OTHER PUBLICATIONS

ITU-T G.983.3: A broadband optical access system with increased service capability by wavelength allocation, Mar. 2001, pp. 1-59.*

Chraplyvy et al: Performance Degradation Due to Stimulated Raman Scattering in Wavelength-Division-Multiplexed Optical-Fiber Systems, Electronics Letters, Aug. 4, 1983, vol. 19, No. 16, pp. 641-643.*

"Evaluation of the Effect by Simulated Raman Scattering on GE-PON and Video Multiplexed System" The 2004 IEICE Communications Society Conference (Sep. 21-24, 2004), (with English Translation).

"ITU-T G 984, (Feb. 2004)" Series G: Transmission Systems and Media, Digital Systems and Networks, 113 Pages.

* cited by examiner

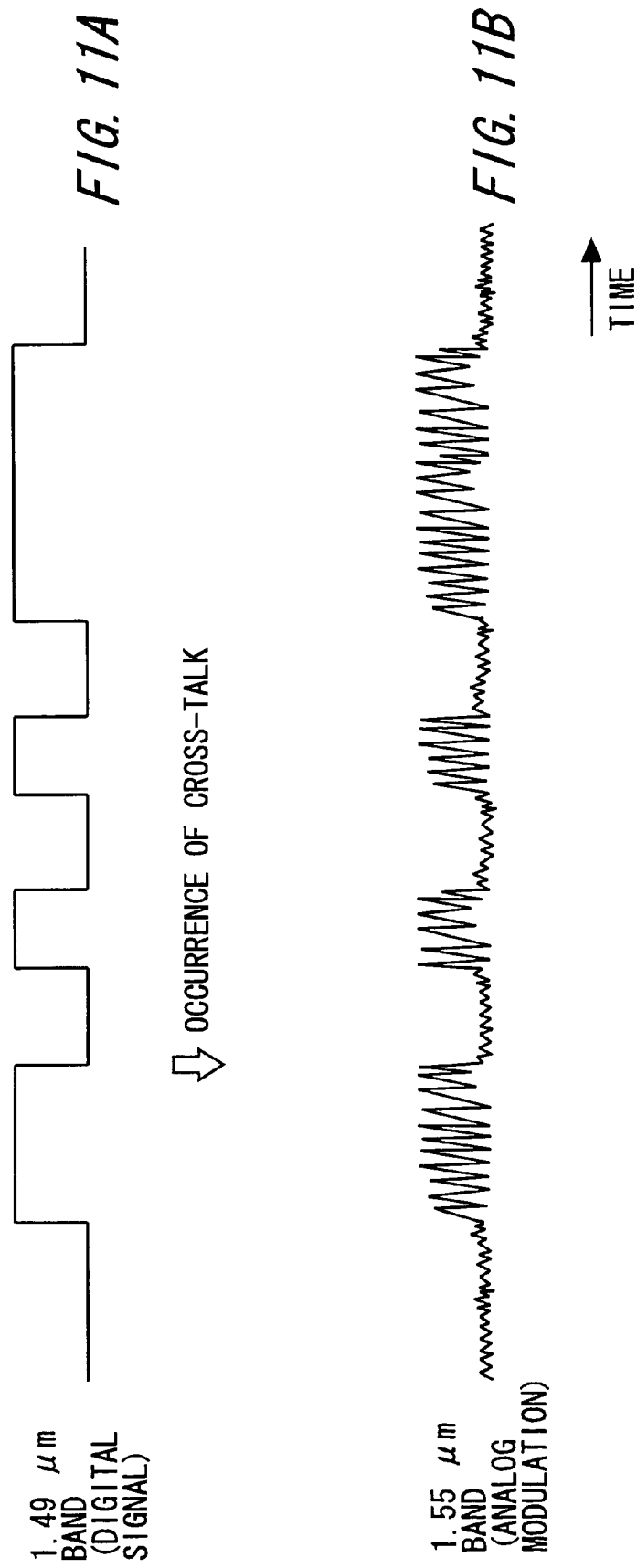

OPTICAL TRANSMISSION SYSTEM AND OPTICAL TRANSMISSION METHOD

BACKGROUND OF THE INVENTION

The invention relates to a technology that is effective in its being applied to a system and a method for reducing influence of cross-talk occurred in the case of wavelength-division-multiplexing a digital signal and an analog signal.

With the spread of the Internet, actualization of a large-capacity transmission service using optical fibers is underway. One of this type of large-capacity transmission services is a service in which multi-channel video signals are multiplexed by optical wavelength division multiplexing technology and thus distributed. A system utilized for this transmission service is established by the International Standardization s ITU (International Telecommunication Union) (G983.3) and is scheduled to be introduced into general households.

FIG. 8 shows a conventional example of an optical transmission system that multiplexes an analog optical signal and a digital optical signal by wavelength division multiplexing, and thus transmits the multiplexed signals. An optical transmission system P1 based on the prior art includes, an OLT (Optical Line Terminal) P2, a head end P3, a 1.55 µm (micrometer) optical transmitter P4, a star coupler P5, an ONU (Optical Network Unit) P6 and a user terminal P7. The OLT P2 includes a light transmitting/receiving unit P22, and a WDM (wavelength Division Multiplexing) optical coupler P23. A plurality of ONUs P6 and a plurality of user terminals P7 may be connected to one single star coupler P7. Downstream signals from the light transmitting/receiving unit P22 and the 1.55 µm optical transmitter P4 are wavelength-division-multiplexed by the WDM optical coupler P23, and transmitted through the star coupler P5 to the respective user terminals P7 via the respective ONUs P6.

FIG. 9 is a diagram showing an example of wavelengths of signals used in the optical transmission system P1 based on the prior art. FIG. 9 shows a case where the International s G983.3 are applied by way of a specific example. In the International s G983.3, 1.3 µm band (1.26 µm through 1.36 µm) is applied to upstream digital optical signals from a subscriber. Similarly, a 1.49 µm band (1.48 µm through 1.50 µm) is applied to downstream optical signals from the light transmitting/receiving unit P22, and a 1.55 µm band (1.55 µm through 1.56 µm) is applied to the downstream analog optical signals from the 1.55 µm optical transmitter P4, respectively. The downstream digital optical signal and the downstream analog optical signal are multiplexed by the WDM optical coupler P23 and thus transmitted to the side of subscriber (the side of the user terminal P7).

A video signal is given as one of specific examples of the downstream analog signals. An optical analog transmission system based on amplitude modulation multi-carriers (multiplexed carriers) using frequency division multiplexing (FDM), can be applied to transmission of the video signals. When this type of optical analog transmission system is applied, the head end P3 evenly allocates video channels at an interval of 6 MHz in several tens of MHz (megahertz) through 770 MHz. FIG. 10 is a diagram showing an example of the frequency division multiplexing of the video signals.

Note that a specific example of the prior art of this type of optical transmission system is a technology (refer to Patent documents 1, 2) for preventing, when the OLT P2 transmits the downstream signals to the plurality of user terminals P7, the downstream signals addressed to a certain user terminal P7 from being eavesdropped by other user terminal P7.

According to this technology, for instance, the OLT P2 implements intrinsic scrambling upon the downstream signals addressed to the individual user terminals P7 and transmits these signals to the respective user terminals P7. Then, each user terminal P7 receiving this piece of data decodes the downstream signal by implementing descrambling by use of a key code associated with the user terminal P7 itself.

Further, technologies disclosed in Patent document 3 and Patent document 4 are given as examples of Raman depression method.

[Patent Document 1]
Japanese Patent Application Laid-Open Publication No. 06-188878
[Patent Document 2]
Japanese Patent Application Laid-Open Publication No. 07-193566
[Patent Document 3]
Japanese Patent Application Laid-Open Publication No. 2002-50985
[Patent Document 4]
International Publication Pamphlet No. 2002/035665

SUMMARY OF THE INVENTION

It is known that if the 1.49 µm band optical signal has strong intensity, however, there occurs cross-talk interference with other signals (e.g., 1.55 µm band video signals, etc.) due to a non-liner effect (induced Raman scattering) of an optical fiber. FIG. 11A and FIG. 11B are diagrams showing an example of the cross-talk interference. As shown in FIG. 11A and FIG. 11B, a 1.55 µm band signal is amplified, wherein a 1.49 µm band digital optical signal serves as an excitation light source due to the induced Raman scattering. Therefore, a degree of amplification of the 1.55 µm band analog signal (the video signal) non-linearly changes according to the intensity of the 1.49 µm band digital optical signal, with the result that 1.55 µm band signal gets deformed. In other words, there comes to a state of causing the cross-talk interference with the 1.55 µm band signal.

The invention aims at solving those problems and providing a method, a system, etc. that reduce influence of cross-talk interference caused by an optical signal having one wavelength band in an optical signal having the other wavelength band when multiplexing the optical signals having a plurality of different wavelength bands.

[First Mode]

To solve the problems, the invention takes the following configurations. A first mode of the invention is an optical transmission system including a signal processing unit, a converting unit and an wavelength division multiplexing unit. The signal processing unit implements a scrambler upon an electric signal of digital signals to be transmitted to a user terminal. The digital signals to be transmitted to the user terminal are digital signals transmitted to the user terminal from a station side (a server side) in this system. The scrambler serves to randomize a transmission code sequence of the inputted digital signals. The converting unit converts the scrambler-implemented electric signal of the digital signals into a digital optical signal. The wavelength division multiplexing unit multiplexes, by wavelength division multiplexing, an analog optical signal and the digital signal to be transmitted to the user terminal, and transmits the multiplexed signals to the user terminal.

According to the first mode of the invention, the digital signals to be transmitted to the user are, before being multiplexed with the analog signals by the wavelength division multiplexing unit, are previously implemented with the scrambler. Hence, the intensity, of each of spectral components of electrical frequency spectrums of the digital signals to be multiplexed, decreases. By the way, a degree of influence of the cross-talk interference that is exerted by the digital signal upon the analog signal when multiplexed, non-linearly depends on the intensity of each spectral component of the digital signal. Therefore, according to the first mode of the invention, it is possible to reduce the influence of the cross-talk interference that is exerted by the digital signal upon the analog signal when multiplexed.

The analog optical signal in the first mode of the invention may be a signal electrically transmitted through on multiplexed carriers at an interval of 6 MHz, and each of the carriers may be structured to have a gap of 2 MHz from a neighboring carrier.

In the case of this configuration, there occur some of the spectral components of the electrical frequency spectrums of the digital signals, which are positioned in gaps between the carriers. These spectral components do not exert the influence of the cross-talk on the analog signals. It is therefore possible to reduce the influence of the cross-talk.

The signal processing unit in the first mode of the invention may be constructed to implement the scrambler of which a pattern period is equal to or greater than 500 nsec. The scrambler of which a pattern period, which is equal to or greater than 500 nsec, is generally a scrambler having a well long pattern period. In the case of implementing the scrambler having thus the well long pattern period, intensity of each of the spectral components of the digital signals becomes sufficiently small, and the influence of the cross-talk interference can be reduced. Further, a gap between the respective spectral components of the electrical frequency spectrums of the digital signals subjected to the implementation of the scrambler of which the pattern period is equal to or greater than 500 nsec, becomes equal to or smaller than 2 MHz. Accordingly, when the gap between the carriers in the analog signals transmitted particularly through on the multiplexed carriers is on the order of 2 MHz, the spectral component of the digital signal is invariably positioned in the gap between the carrier, and it is possible to effectively reduce the influence of the cross-talk interference.

The analog optical signal in the first mode of the invention may be a 1.55 µm band analog optical signal. In this case, the converting unit is constructed to convert the electric signal of the digital signals into a 1.49 µm band digital optical signal, and the wavelength division multiplexing unit is constructed to multiplex the 1.49 µm band digital optical signal and the 1.55 µm band analog optical signal.

[Second Mode]

A second mode of the invention is an optical transmission system including wavelength division multiplexing unit and branching unit. The wavelength division multiplexing unit multiplexes, by wavelength division multiplexing, a first optical signal to be transmitted to a user terminal and a second optical signal to be transmitted to the user terminal, and transmits the multiplexed signals to the side of the user terminal. The branching unit is installed at such a degree of distance from the wavelength division multiplexing unit as to make ignorable cross-talk influence of the first optical signal upon the second optical signal in the multiplexed optical signals. The branching unit branches the optical signals transmitted from the wavelength division multiplexing unit into a plurality of optical transmission paths, and transmits the branched optical signals to the sides of the user terminals.

According to the second mode of the invention, after the multiplexing the first optical signal (e.g., the digital optical signal in the first mode) and the second optical signal (e.g., the analog optical signal in the first mode), the branching unit installed at such a degree of distance as to make the cross-talk influence ignorable branches the optical signals. The degree of the cross-talk influence increases corresponding to a transmission distance, and hence the degree of the cross-talk influence when the optical signal reaches the branching unit can be adjusted by adjusting a distance between the branching unit and the wavelength division multiplexing unit. Further, the degree of the cross-talk influence upon the second optical signal from the first optical signal non-linearly increases corresponding to a signal level of the first optical signal. Accordingly, the branching unit installed at such a degree of distance as to make the cross-talk influence ignorable branches the optical signals, whereby the signal level thereof decreases and it is possible to restrain the cross-talk influence in the optical signal thereafter. Hence, according to the second mode of the invention, the cross-talk influence on the optical signal to be transmitted to the side of the user terminal can be reduced.

[Third Mode]

A third mode of the invention is an optical transmission system including a plurality of wavelength division multiplexing unit, first branching unit and second branching unit. The plurality of wavelength division multiplexing unit multiplex, by wavelength division multiplexing, first optical signals to be transmitted to user terminals and second optical signals to be transmitted to the user terminals, and transmits the multiplexed signals to the sides of the user terminals. The first branching unit branches and thus transmits the first optical signals to the plurality of wavelength division multiplexing unit. The second branching unit branches and thus transmits the second optical signals to the plurality of wavelength division multiplexing unit. Then, the wavelength division multiplexing unit multiplex the optical signals transmitted from the first branching unit and from the second branching unit.

According to the third mode of the thus-configured invention, the first optical signal (e.g., the digital optical signal in the first mode) and the second optical signal (e.g., the analog optical signal in the first mode) are, before being multiplexed, branched by the first branching unit and the second branching unit. Then, the wavelength division multiplexing unit multiplexes the first optical signal and the second optical signal that are branched by the first branching unit and the second branching unit and decrease in their transmission levels. It is therefore possible to reduce the cross-talk influence in the optical signals after being multiplexed.

The first through third modes may also be specified by methods in which the respective unit execute processing.

According to the invention, it is possible to reduce the influence of the cross-talk occurred in the optical signals multiplexed by the wavelength division multiplexing.

BRIEF DESCRIPTION OF THE DRAWINGS

FIGS. 11A and 11B are diagrams showing an example of cross-talk interference.

DETAILED DESCRIPTION OF THE INVENTION

First Embodiment

Figure 1:
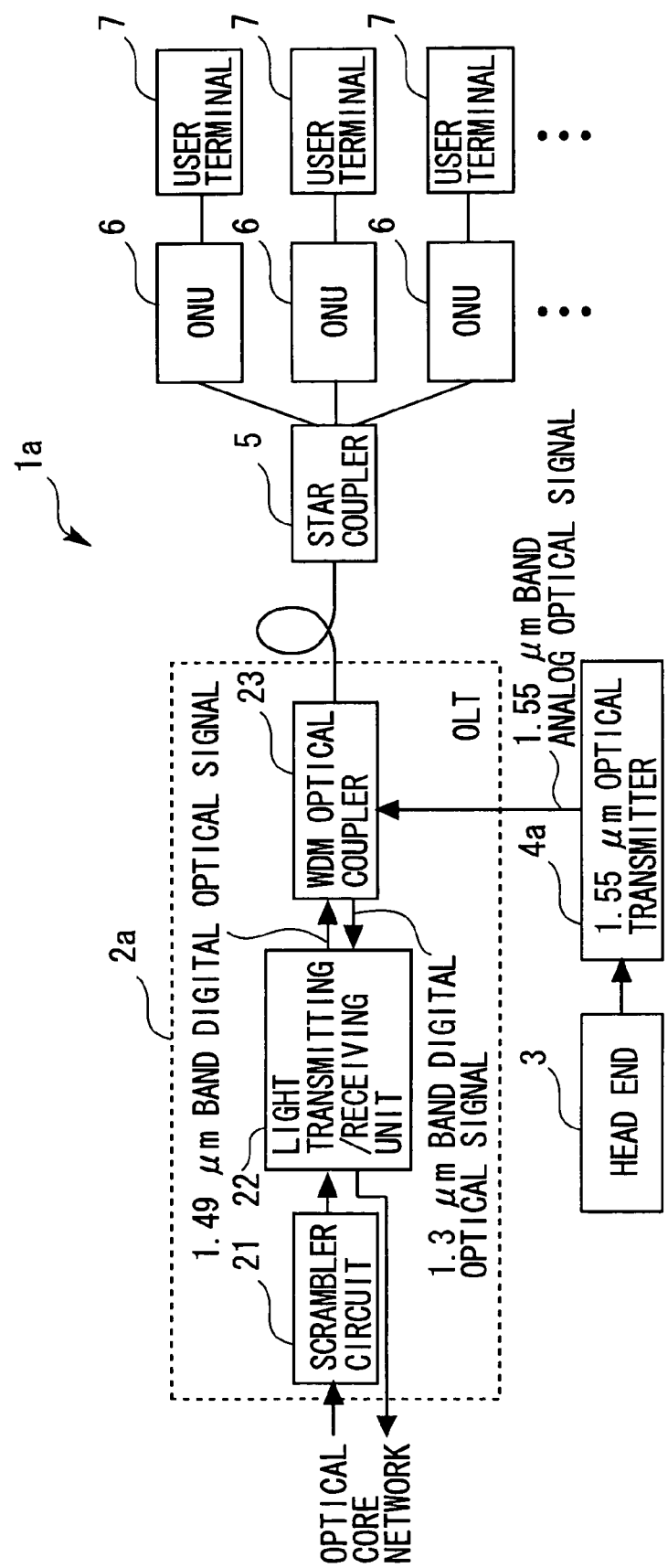
FIG. 1 is a diagram showing an example of a system architecture in a first embodiment of an optical transmission system.

To start with, an example of architecture of an optical transmission system 1*a* will be explained by way of a first embodiment of an optical transmission system 1. FIG. 1 is a diagram showing the example of the system architecture of the optical transmission system 1*a*. The optical transmission system 1*a* includes an OLT 2*a*, a head end 3, a 1.55 µm optical transmitter 4*a*, a star coupler 5, an ONU 6 and a user terminal 7. The optical transmission system may also be configured so that a plurality of ONUs 6 and a plurality of user terminals 7 are connected to one single star coupler 5.

The OLT 2*a* includes a scrambler circuit 21, a light transmitting/receiving unit 22 and a WDM optical coupler 23. The OLT 2*a* is different from an existing OLT device in terms of including the scrambler circuit 21. Accordingly, the OLT 2*a* may be constructed by adding the scrambler circuit 21 to the existing OLT device. The OLT 2*a* is installed between an optical core network and the star coupler 5.

Figure 2:
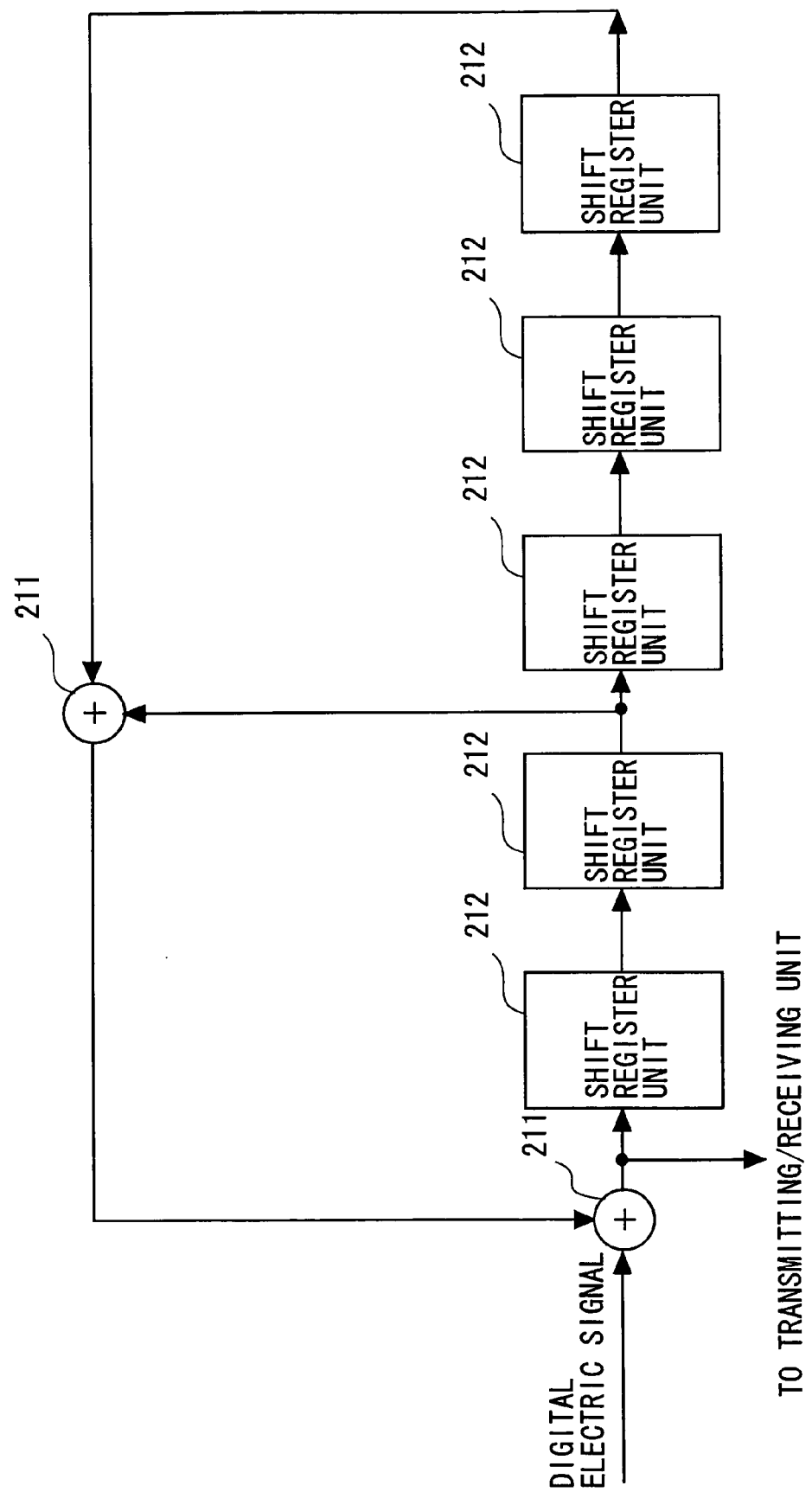
FIG. 2 is a diagram showing an example of a scrambler circuit.

The scrambler circuit 21 effects scrambling (implements a scrambler) upon downstream digital electric signals (which are particularly the digital electric signals that are converted into digital optical signals of a 1.49 µm band by the light transmitting/receiving unit 22 in this example) transmitted to the user terminal 7. The scrambler is classified into a self-synchronous type and a reset type. FIG. 2 shows a specific example of the self-synchronous type scrambler circuit 21. The scrambler circuit 21 may also be constructed by connecting, for example, an exclusive OR circuit 211 and a shift register unit 212 as shown in FIG. 2. The circuit in FIG. 2 is given as an example of construction of the scrambler circuit 21, and the scrambler circuit 21 may also be constructed of other circuit.

It is desirable that the scrambler circuit 21 be so constructed as to implement the scrambler having a long pattern period upon the digital electric signal. The digital electric signals subjected to the implementation of the scrambler having a longer pattern period are diffused with finer spectrums (the signals are diffused with waves of a larger number of frequencies) than in the case of being subjected to the implementation of the scrambler having a shorter pattern period. Given hereinafter is an explanation about an effect yielded when the digital electric signals are diffused with the finer spectrums.

Figure 3:
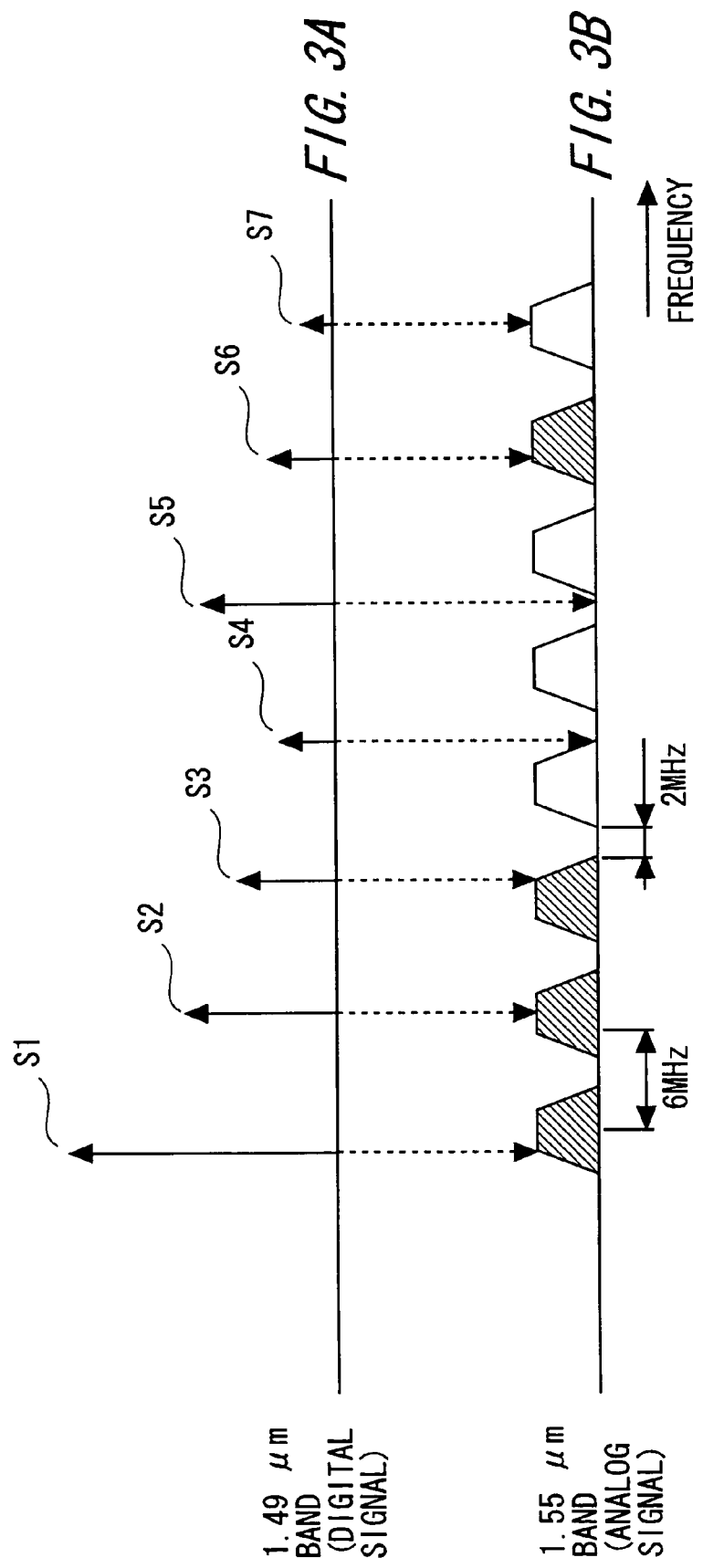
FIGS. 3A and 3B are diagrams showing an example of frequency cross-talk interference by a digital signal.
Figure 10:
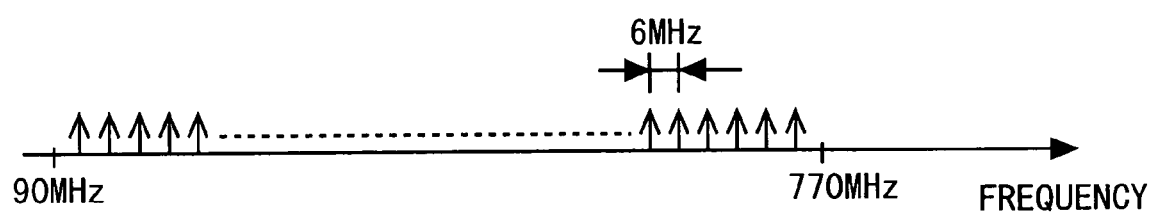
FIG. 10 is a diagram showing an example of frequency multiplexing of video signals.

FIG. 3A and FIG. 3B are diagrams showing a relation between electrical frequency spectrums of the digital signals and electric frequency spectrums of analog signals that suffer interference of cross-talk. The electrical frequency spectrums of a 1.49 µm band digital signal are shown in FIG. 3A. The electrical frequency spectrums of a 1.55 µm band analog signal are shown in FIG. 3B. The 1.55 µm band analog signals may also be, e.g., video signals. In this case, as shown in FIG. 10, the signals are distributed (divided) into carriers at an interval of 6 MHz, wherein each carrier has a gap of 2 MHz from a neighboring carrier.

The 1.49 µm band digital optical signals are subjected to some sort of a code conversion in order to avoid continuation of the same codes. As a result, line spectrums become coarse, resulting in occurrence of an area exhibiting a strong intensity of the frequency spectrum. To decompose the optical cross-talk into the electrical frequency spectrums, as shown in FIG. 3A and FIG. 3B, there is a case, it is understood, spectral components of the cross-talk digital signals concentrate at part of analog channels. In such a case, the signal of this analog channel is deteriorated. In FIG. 3A and FIG. 3B, the analog channels with the deterioration occurred are depicted by hatching, while the analog channels with almost no deterioration occurred are outlined in white. Each spectral component of the digital signal, when the electrical frequency thereof is overlapped with the analog channel, deteriorates the signal of the analog channel overlapped with the frequency. Hence, the spectral components (e.g., spectral components S4, S5) of the digital signal positioned in the gap between the analog channels does not deteriorate the analog channel. Further, a degree of the deterioration non-linearly depends on intensity of the spectral component of the digital signal. Therefore, even in the spectral component of which the frequency is overlapped with the analog channel, if the intensity thereof is well small (smaller than a threshold value), the deterioration in the analog channel can be ignored (as in, e.g., a spectrum S7). Based on this, it proves effective in reducing the influence of the cross-talk upon the 1.55 µm band analog optical signals due to the 1.49 µm band digital optical signals to insert a larger amount of spectral components in the gaps (the gaps of 2 MHz as seen in FIG. 3A and FIG. 3B). Further, it also proves effective to decrease the intensity of each spectral component of the digital signal down to such a degree as to make ignorable adverse influence of the cross-talk.

Figure 4:
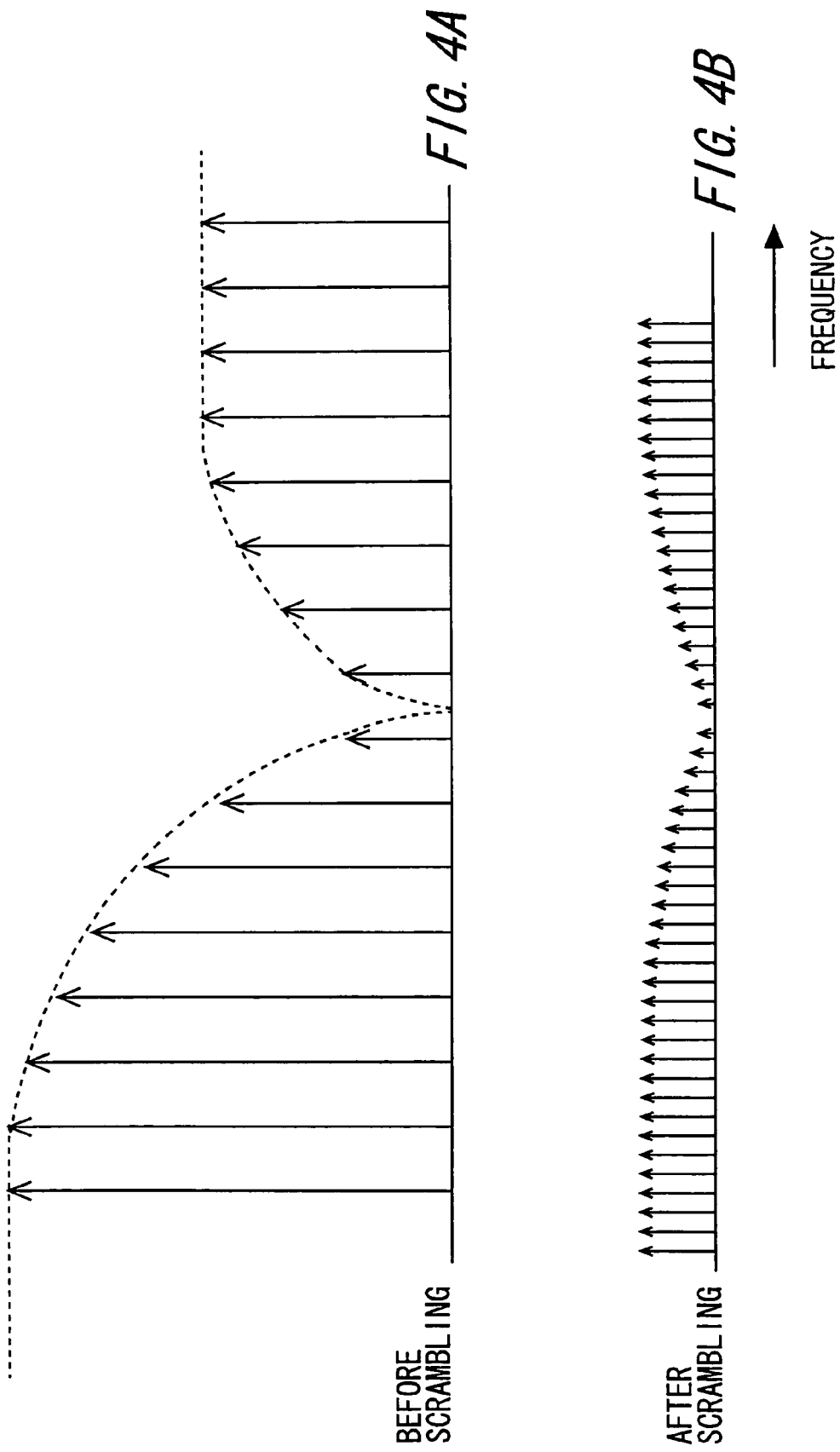
FIGS. 4A and 4B are diagrams showing an example of spectral diffusion.

FIG. 4A and FIG. 4B are graphs showing an example in which the digital signal is spectrum-diffused by the scrambler. When the digital signal is diffused with the finer spectrums, there increases probability that the spectral component of the digital signal is positioned in the gap between the analog carriers. Accordingly, the deterioration of the analog carrier due to the cross-talk is reduced on the whole. Further, when the digital signal is diffused with the finer spectrums, the intensity of each spectral component decreases. Hence, the specified analog carrier (that is the analog carrier of which the frequency is overlapped with the spectral component of the digital signal) is prevented from conspicuously deteriorating. In other words, the spectral components of the digital signals are prevented from concentrating at part of the analog carriers. Further, the digital signals are diffused with the finer spectrums, and consequently there decreases the intensity (the signal intensity of each frequency after being diffused) of each of the spectral components after being diffused, whereby there are generated a larger quantity of spectral components having the intensity that is as small as making ignorable the adverse influence of the cross-talk. The deterioration of the analog carrier due to the cross-talk can be reduced also by this action. In other words, in the electrical spectrum, the intensity per frequency decreases, and it is therefore possible to reduce the cross-talk interference with the analog signal per carrier. As a result, a transmission level of the digital optical signal can be improved.

The 1.55 µm band analog optical signal (e.g., the video signal) has hitherto been sensitive to a disturbance because of utilizing the analog modulation such as vestigial side band (VSB) modulation, etc., and hence it was required that the transmission level of the 1.49 µm band digital optical signal be restricted low in order to reduce the cross-talk interference caused by induced Raman scattering. For attaining this, there was a necessity of shortening a transmissible distance of the 1.49 µm band digital optical signal or reducing the number of the user terminals 7 serving as distribution destinations. According to the transmission system 1a, however, the transmission level of the digital optical signal can be improved as described above, and it is therefore feasible to improve the transmission distance and to increase the number of the user terminals 7 (the number of subscribers).

A more specific example will be described. In a case where the 1.49 µm band digital optical signal and the 1.55 µm band analog optical signal are multiplexed, especially in a case where the 1.55 µm band analog optical signal is frequency-multiplexed as shown in FIG. 10, it is desirable that the scrambler circuit 21 implements the scrambler with the pattern period that is equal to or greater than 500 nsec (nanosecond) upon the digital electric signal to be converted into the 1.49 µm band digital optical signal. The reason why so is that a spectral interval in the case of the digital signal being diffused by the scrambler is required to be well narrower than the signal band per carrier of the analog signal. As stated above, the carrier interval is on the order of 6 MHz, while the signal band of the carrier is on the order of 4 MHz, and it is therefore desirable that the scrambler-based spectral interval of the digital signal be set at 2 MHz leastwise. Accordingly, it is desirable that the pattern period of the scrambler be equal to or greater than 500 nsec.

The light transmitting/receiving unit 22 converts the digital electric signal outputted from the scrambler circuit 21 into the digital optical signal, and transmits the digital optical signal to the WDM optical coupler 23. The light transmitting/receiving unit 22 may further be so constructed as to receive the digital optical signal (e.g., a 1.3 µm band digital signal) from the WDM optical coupler 23 and convert the optical signal into the digital electric signal.

The head end 3 transfers the analog electric signal, which should be transmitted to the side of the user terminal 7, to the 1.55 µm optical transmitter 4a. Then, the 1.55 µm optical transmitter 4a converts the inputted analog electric signal into the analog optical signal (e.g., the 1.55 µm band analog optical signal) and transmits the optical signal to the WDM optical coupler 23.

The WDM optical coupler 23 multiplexes the digital signal (which is herein the 1.49 µm band digital optical signal) outputted from the light transmitting/receiving unit 22 and the analog optical signal (which is herein the 1.55 µm band analog optical signal) outputted from the 1.55 µm optical transmitter 4a) by use of the WDM. The WDM optical coupler 23 transmits the multiplexed optical signals to the star coupler 5.

Figure 5:
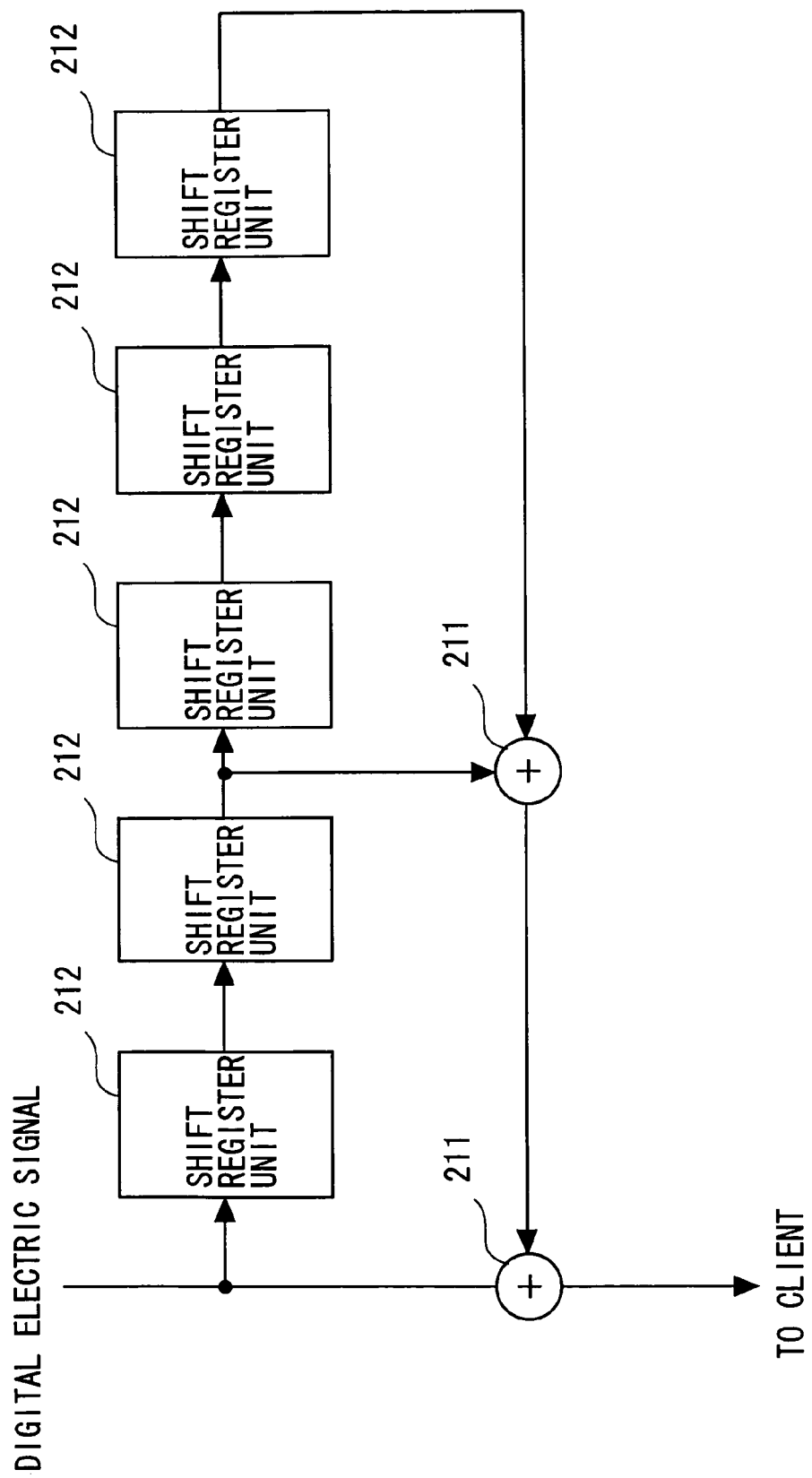
FIG. 5 is a diagram showing an example of a descrambler circuit.

The star coupler 5 receives the optical signals transmitted from the WDM optical coupler 23, and sends the received optical signals to the ONUs 6 connected to the star coupler 5 itself in a way that branches these signals into the respective ONUs 6. The ONU 6 receives the optical signals transmitted from the star coupler 5 and demultiplexes these optical signals into the 1.49 µm band digital optical signal and the 1.55 µm band analog optical signal. Then, the ONU 6 converts the 1.49 µm band digital optical signal into the digital electric signal, and transfers this electric signal to a device for processing the digital signal among the user terminals 7. At this time, the ONU 6, after implementing a descrambler using a descrambler circuit upon the digital electric signal, transfers a resultant digital electric signal to the user terminal 7. FIG. 5 is a diagram showing an example of a self-synchronization type descrambler circuit. Further, the ONU 6 converts the 1.55 µm band analog optical signal into the analog electric signal, and transfers this analog electric signal to each of the devices for processing the analog signals among the user terminals 7.

The user terminal 7 is constructed by use of a device for processing the digital signal and a device for processing the analog signal. the user terminal 7 may be, for instance, a network terminal device (an information processing device: client) that executes processing by receiving packet data as the digital signals, and may also be a set-top box that helps a display device (such as a TV set) visualize a picture by receiving the video signals as the analog signal.

Second Embodiment

Figure 6:
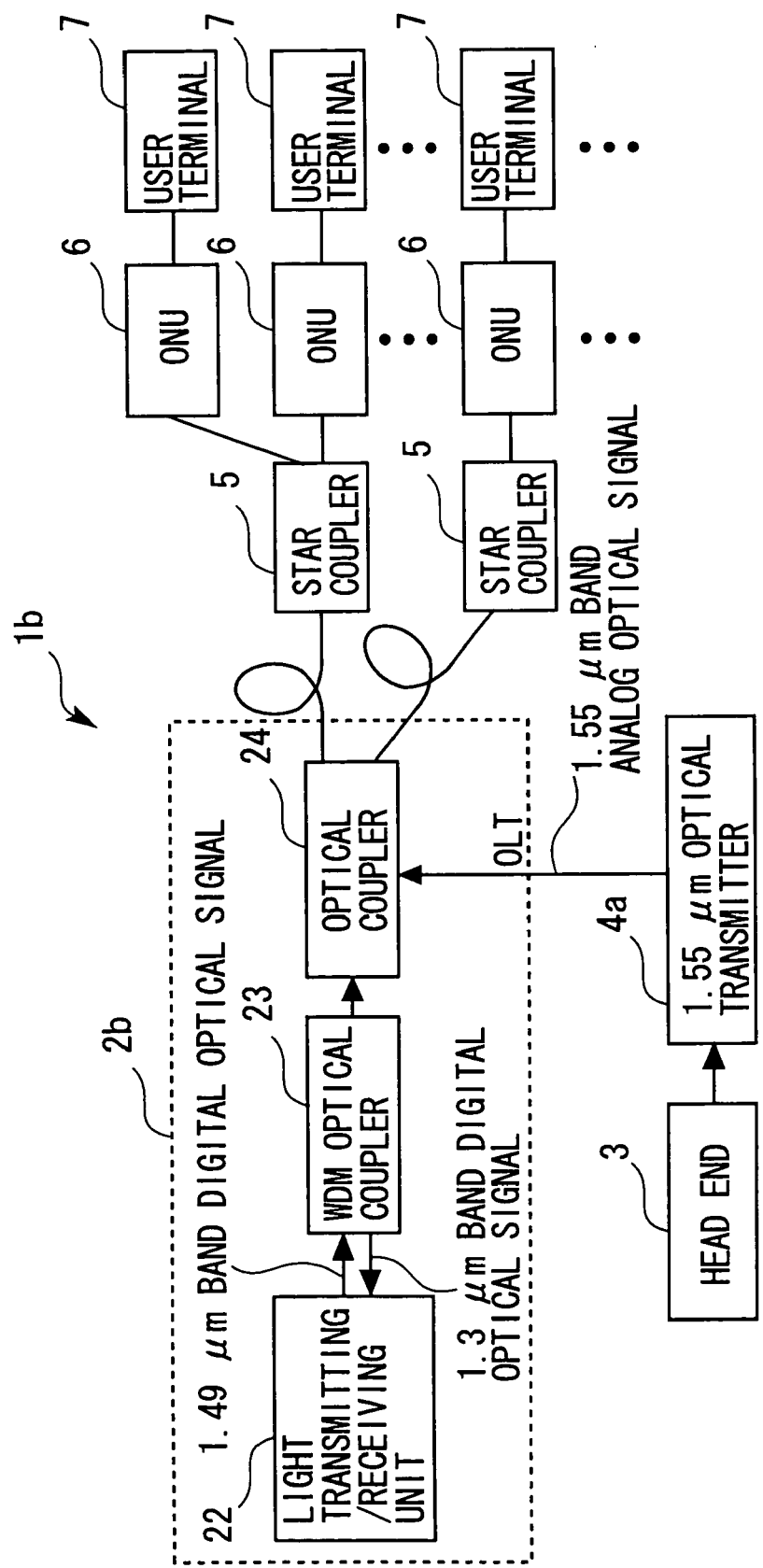
FIG. 6 is a diagram showing an example of system architecture in a second embodiment of the optical transmission system.

Next, an example of architecture of an optical transmission system 1b will be explained by way of a second embodiment of the optical transmission system 1. FIG. 6 is a diagram showing the example of the system architecture of the optical transmission system 1b. The optical transmission system 1b includes an OLT 2b, the head end 3, the 1.55 µm optical transmitter 4a, the star coupler 5, the ONU 6 and the user terminal 7. The optical transmission system 1b may also be configured so that the plurality of ONUs 6 and the plurality of user terminals 7 are connected to one single star coupler 5. Further, in the optical transmission system 1b, the OLT 2b includes an optical coupler 24. Then, the plurality of star couplers 5 located on the side of the user terminal are connected to this optical coupler 24, and in anteriority to the star couplers 5 the ONUs 6 and the user terminals 7 are connected. Note that the respective devices (excluding the OLT 2b) employed in the optical transmission system 1b are the same as those used in the optical transmission system 1a, and therefore the explanations about the respective devices other than the OLT 2b are omitted.

The OLT 2b is different from the OLT 2a in terms of requiring none of the scrambler circuit 21 and including the optical coupler 24. Namely, the OLT 2b may be constructed in a form that adds the optical coupler 24 to the existing OLT device, and may also be constructed in a form that adds the optical coupler 24 to the OLT 2a as a device including the scrambler circuit 21 and the optical coupler 24.

The optical coupler 24 branches and thus transmits the optical signals sent from the WDM optical coupler 23 to the plurality of star couplers 5 connected to the optical coupler 24 itself. The optical coupler 24 is installed at a distance that is as close to the WDM optical coupler 23 as causing no occurrence of the induced Raman scattering.

In the optical transmission system 1b configured as described above, the multiplexed optical signals are branched by the optical coupler 24 before the induced Raman scattering occurs. When branched, a signal level of the multiplexed optical signal decreases. Namely, the intensity (the signal level) of the 1.49 µm band digital optical signal decreases. Therefore, in the multiplexed optical signals, the occurrence of the induced Raman scattering with respect to the 1.55 µm band analog optical signals is restrained, whereby the influence of the cross-talk interference can be reduced. Accordingly, the designer adjusts the intensity of the 1.49 µm band digital optical signal by controlling the number of branches from the optical coupler 24 and is thereby able to control the influence of the cross-talk interference.

Third Embodiment

Figure 7:
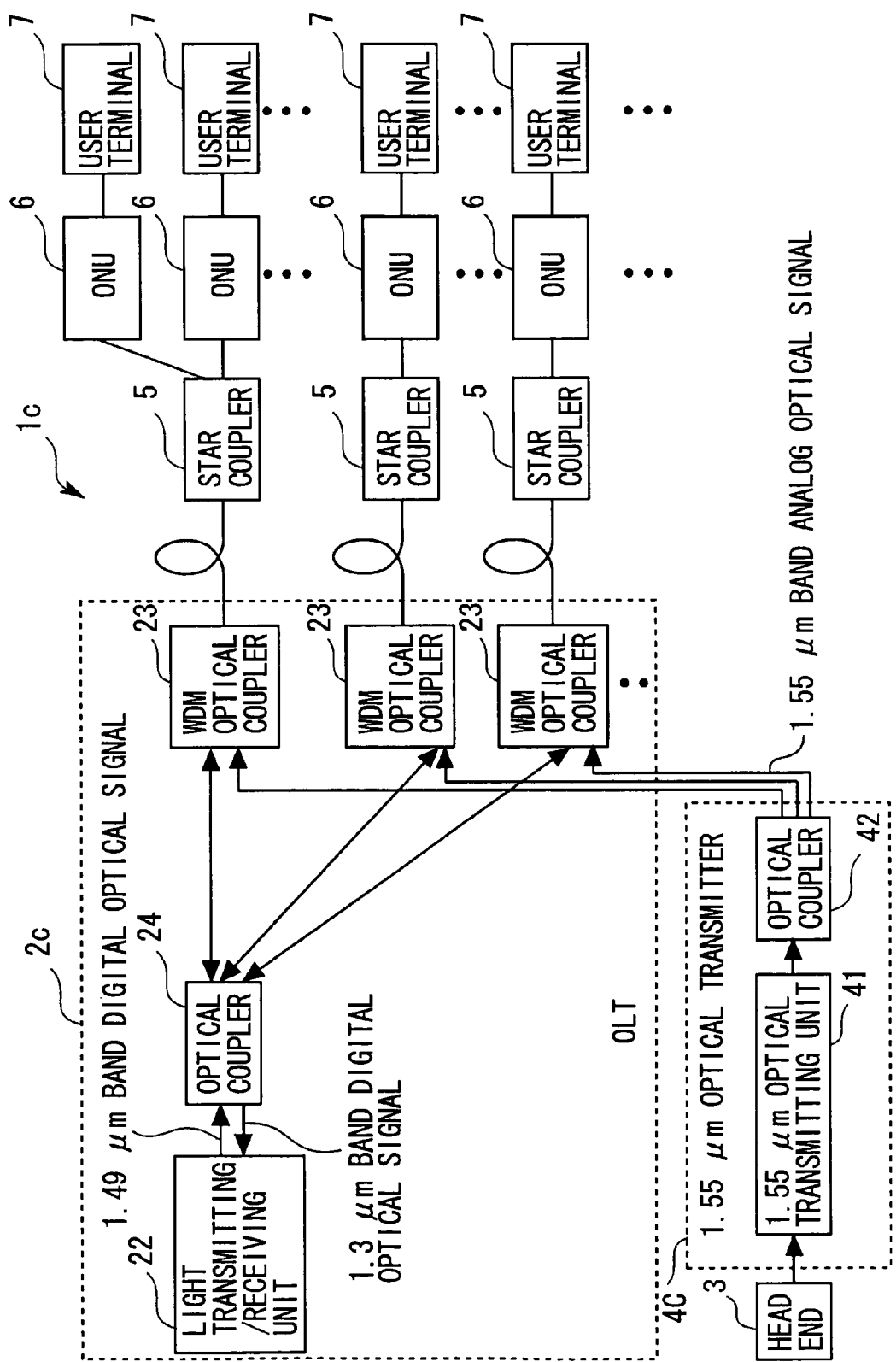
FIG. 7 is a diagram showing an example of system architecture in a third embodiment of the optical transmission system.
Figure 8:
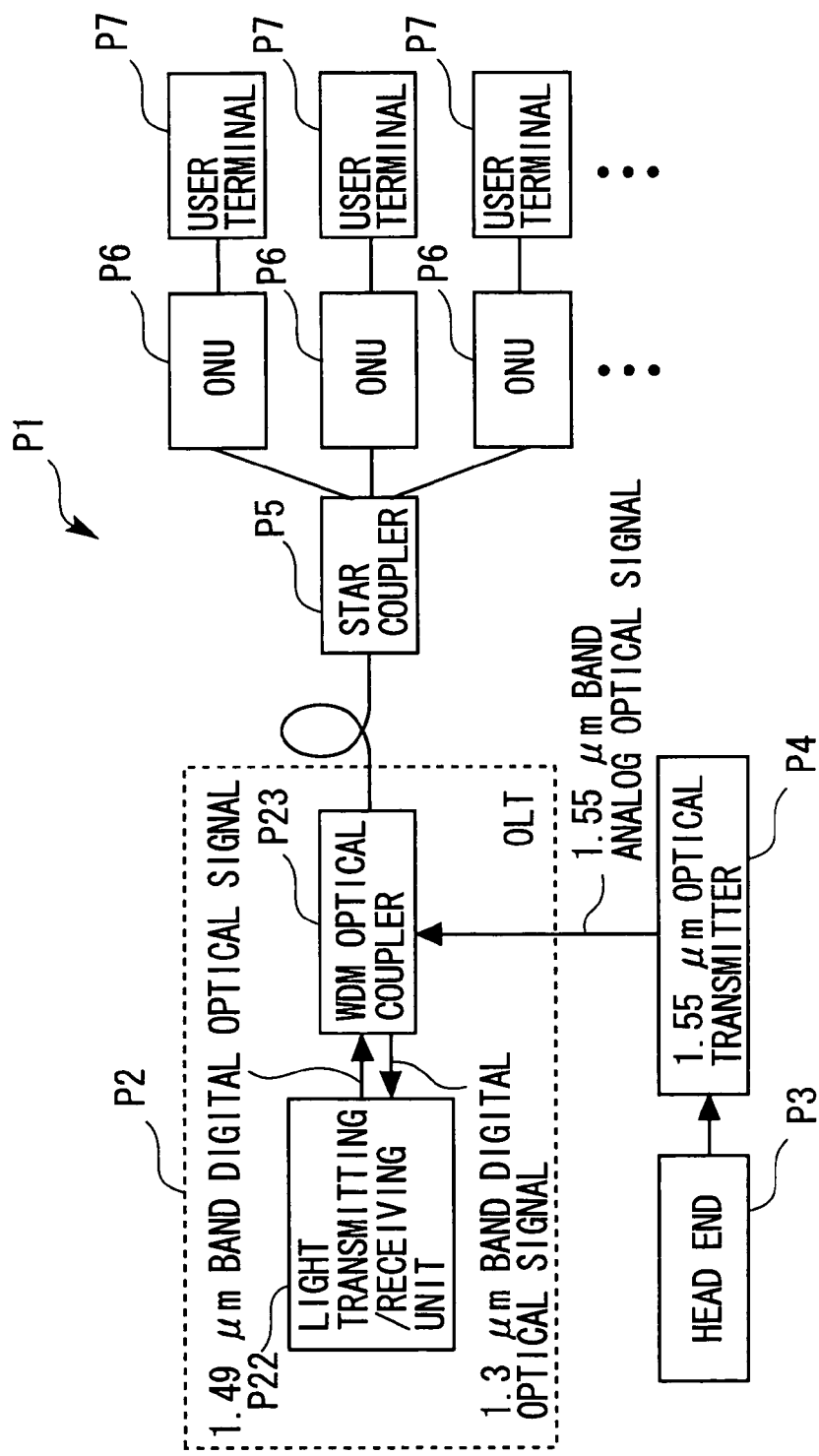
FIG. 8 is a diagram showing an example of a conventional optical transmission system.
Figure 9:
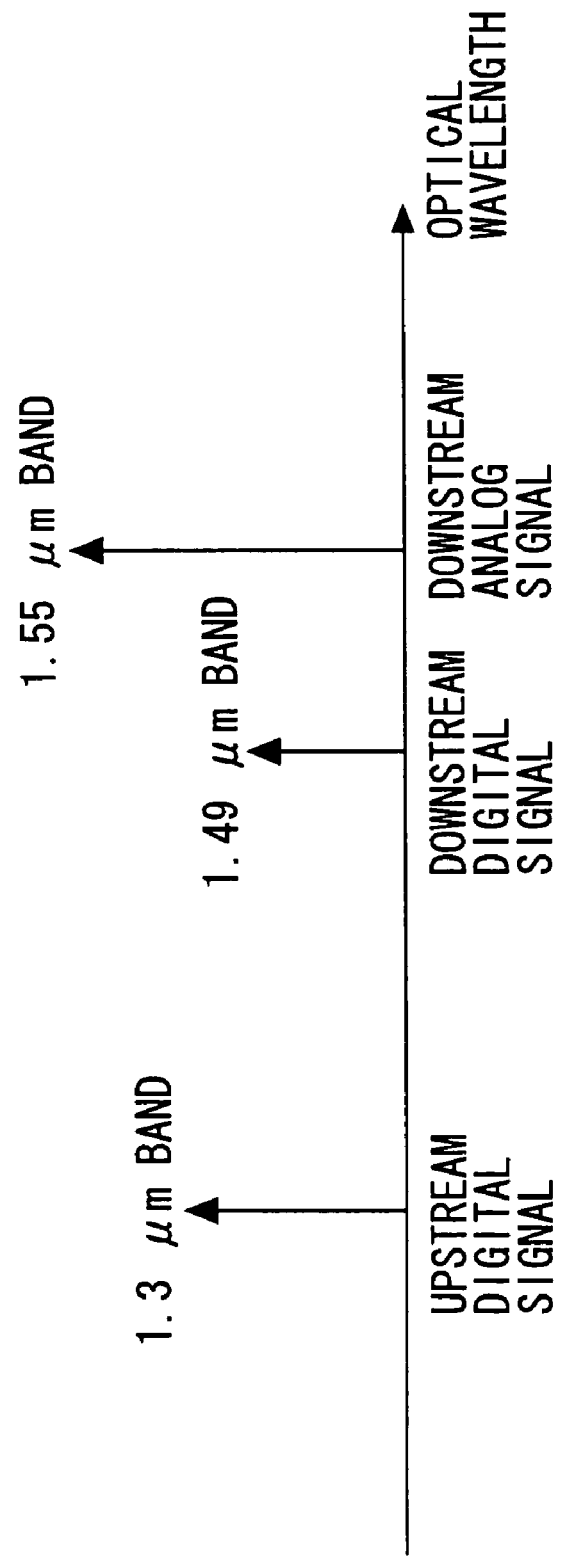
FIG. 9 is a diagram showing an example of wavelength allocation of respective optical signals.

Next, an example of architecture of an optical transmission system 1c will be explained by way of a third embodiment of the optical transmission system 1. FIG. 7 is a diagram showing the example of the system architecture of the optical transmission system 1c. The optical transmission system 1c includes an OLT 2c, the head end 3, a 1.55 µm optical transmitter 4c, the star coupler 5, the ONU 6 and the user terminal 7. The optical transmission system 1c may also be configured so that the plurality of ONUs 6 and the plurality of user terminals 7 are connected to one single star coupler 5. Note that the respective devices employed in the optical transmission system 1c are, except constructions of the OLT 2c and of the 1.55 µm optical transmitter 4c, the same as those used in the optical transmission system 1b. Therefore, the explanations about the respective devices other than the OLT 2c and the 1.55 µm optical transmitter 4c are omitted.

The OLT 2c is different from the OLT 2b in terms of such a point that the plurality of WDM optical couplers 23 are connected to the optical coupler 24. Then, each of the WDM optical couplers 23 is connected to an optical coupler 42 of the 1.55 µm optical transmitter 4c.

The 1.55 µm optical transmitter 4c is constructed by using a 1.55 µm light transmitting/receiving unit 41 and the optical coupler 42. The 1.55 µm light transmitting/receiving unit 41 converts the analog electric signals inputted from the head end 3 into the 1.55 µm band analog optical signals, and transmits these optical signals to the optical coupler 42. The optical coupler 42 branches the analog optical signals inputted from the 1.55 µm light transmitting/receiving unit 41 into the plurality of WDM optical couplers 23.

Next, features of the optical transmission system 1c will be explained. The optical transmission system 1c includes the optical coupler 24 for branching non-multiplexed digital optical signals into the plurality of WDM optical couplers 23, and the optical coupler 42 for branching non-multiplexed analog optical signals into the plurality of WDM optical couplers 23. In FIG. 7, these couplers 24, 42 correspond to the optical coupler 24 included in the OLT 2c and the optical coupler 42 included in the 1.55 µm optical transmitter 4c connected to the head end 3. Then, each of the WDM optical coupler 23 receives the digital optical signal and the analog optical signal that are branched by the optical coupler 24 and by the optical coupler 42, and multiplexes these optical signal, thus transmitting the multiplexed signals to the star coupler 5.

In the thus-configured optical transmission system 1c, the digital optical signals and the analog optical signals are, before being multiplexed, branched into the plurality of transmission paths, and hence the intensity (the transmission level) of each of the optical signals decreases at a point of time when reaching the WDM optical coupler 23. Therefore, in the multiplexed optical signals, the occurrence of the induced Raman scattering with respect to the 1.55 µm band analog optical signals is restrained, whereby the influence of the cross-talk interference can be reduced. Accordingly, the designer adjusts the intensity of the 1.49 µm band digital optical signal by controlling the number of branches from the optical coupler 24 and is thereby able to control the influence of the cross-talk interference.

What is claimed is:

1. An optical transmission system comprising:
   a signal processing unit capable of implementing a scrambler upon a digital electric signal and thereby randomizing a code sequence of the digital electric signal, and outputting a scrambled digital electric signal;
   a first converting unit converting the scrambled digital electric signal into a digital optical signal;
   a second converting unit converting an analog electric signal into an analog optical signal; and
   a wavelength division multiplexing unit multiplexing, by wavelength division multiplexing, the analog optical signal and the digital optical signal, and transmitting the multiplexed optical signals to a user terminal,
   wherein a wavelength of the analog optical signal and a wavelength of the digital optical signal are such that the analog optical signal is influenced by an induced Raman Scattering of the digital optical signal,
   wherein the signal processing unit implements the scrambler of which a pattern period is equal to or greater than 500 nsec,
   wherein the analog electric signal includes a plurality of channels and one of the plurality of channels in the analog optical signal is affected by the induced Raman Scattering of the digital optical signal, and
   wherein the plurality of channels is located at an interval of 6 MHz, each of the channels has a gap from a neighboring channel, and an interval between frequency spectra of the digital optical signal into which the digital electric signal scrambled by the pattern period is converted is equal to or less than a width of the gap.

2. The optical transmission system according to claim 1, wherein the analog optical signal is located at a 1.55 µm band, and the digital optical signal is located at a 1.49 µm band.

3. An optical transmission system, comprising:
   a signal processing unit capable of implementing a scrambler upon a digital electric signal and thereby randomizing a code sequence of the digital electric signal, and outputting a scrambled digital electric signal;
   a first converting unit converting the scrambled digital electric signal into a digital optical signal;
   a second converting unit converting an analog electric signal into an analog optical signal; and
   a wavelength division multiplexing unit multiplexing, by wavelength division multiplexing, the analog optical signal and the digital optical signal, and transmitting the multiplexed optical signals to a user terminal,
   wherein a wavelength of the analog optical signal and a wavelength of the digital optical signal are such that the analog optical signal is influenced by an induced Raman Scattering of the digital optical signal,
   wherein the analog electric signal includes a plurality of channels, frequencies of the plurality of channels being separated,
   the digital electric signal is randomized by a randomizing frequency, the randomizing frequency being such that more than one of the plurality of channels in the analog optical analog signal are affected by the induced Raman scattering of the digital optical signal, and wherein,
   the plurality of channels is located at an interval of 6 MHz, and each of the channels has a gap of 2 MHz from a neighboring channel, and
   the randomizing frequency is equal to or less than 2 MHz.

4. An optical transmission method comprising:
   scrambling a code sequence of a digital electric signal;
   converting the scrambled digital electric signal into a digital optical signal; and
   multiplexing an analog optical signal and the digital optical signal, wherein
   a wavelength of the analog optical signal and a wavelength of the digital optical signal are such that the analog optical signal is influenced by an induced Raman Scattering of the digital optical signal, the analog optical signal is converted from an analog electric signal into an analog signal, the analog electric signal includes a plurality of channels, frequencies of the plurality of channels being separated, an interval of frequency spectra of the scrambled digital electric signal is well narrower than the signal band per carrier in the analog electric signal, the digital electric signal is randomized by a randomizing frequency, the randomizing frequency being such that more than one of the plurality of channels in the analog optical signal are affected by the induced Raman scattering of the digital optical signal, the plurality of channels is located at an interval of 6 MHz, and each of the channels has a gap of 2-MHz from a neighboring channel, and the randomizing frequency is equal to or less than 2 MHz.

* * * * *

UNITED STATES PATENT AND TRADEMARK OFFICE
CERTIFICATE OF CORRECTION

PATENT NO. : 7,929,862 B2  Page 1 of 1
APPLICATION NO. : 11/045486
DATED : April 19, 2011
INVENTOR(S) : Katsuhiko Hakomori et al.

It is certified that error appears in the above-identified patent and that said Letters Patent is hereby corrected as shown below:

Column 10, Line 54, In Claim 3, after "optical" delete "analog".

Signed and Sealed this
Eighteenth Day of October, 2011

David J. Kappos
*Director of the United States Patent and Trademark Office*